(12) United States Patent
Goodman et al.

(10) Patent No.: US 9,797,222 B2
(45) Date of Patent: *Oct. 24, 2017

(54) FERROFLUID TOOL FOR ENHANCING MAGNETIC FIELDS IN A WELLBORE

(71) Applicant: HALLIBURTON ENERGY SERVICES, INC., Houston, TX (US)

(72) Inventors: George David Goodman, Houston, TX (US); Burkay Donderici, Houston, TX (US); Baris Guner, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/422,866

(22) PCT Filed: Dec. 30, 2013

(86) PCT No.: PCT/US2013/078249
§ 371 (c)(1),
(2) Date: Feb. 20, 2015

(87) PCT Pub. No.: WO2015/102561
PCT Pub. Date: Jul. 9, 2015

(65) Prior Publication Data
US 2016/0040506 A1   Feb. 11, 2016

(51) Int. Cl.
*E21B 41/00* (2006.01)
*E21B 47/00* (2012.01)
(Continued)

(52) U.S. Cl.
CPC .......... *E21B 41/00* (2013.01); *E21B 47/0905* (2013.01); *E21B 49/00* (2013.01); *G01V 3/28* (2013.01); *G01V 3/32* (2013.01)

(58) Field of Classification Search
CPC ...... E21B 41/00; E21B 49/00; E21B 47/0905; G01V 3/28; G01V 3/32
See application file for complete search history.

(56) References Cited

U.S. PATENT DOCUMENTS 3,984,918 A   10/1976   Chaney
4,035,718 A   7/1977   Chandler
(Continued)

FOREIGN PATENT DOCUMENTS

GB   2222680   3/1990
PL   397294   6/2013
(Continued)

OTHER PUBLICATIONS

Dickstein et al., Labyrinthine Pattern Formation in Magnetic Fluids, Science, New Series, vol. 261, No. 5124, Aug. 20, 1993, pp. 1012-1015.
(Continued)

*Primary Examiner* — Brad Harcourt
(74) *Attorney, Agent, or Firm* — Kilpatrick Townsend & Stockton LLP

(57) ABSTRACT

A tool for enhancing or directing magnetic fields using ferrofluids in a downhole system is provided. The downhole system can include a tool body, a source of ferrofluid, and a positioning magnet. The positioning magnet can magnetically couple with the ferrofluid from the source for enhancing or directing a magnetic field through at least a portion of an annulus between the tool body and a wellbore formation.

21 Claims, 7 Drawing Sheets

(51) Int. Cl.
*E21B 47/09* (2012.01)
*G01V 3/28* (2006.01)
*E21B 49/00* (2006.01)
*G01V 3/32* (2006.01)

(56) References Cited

U.S. PATENT DOCUMENTS

| | | | |
|---|---|---|---|
| 4,350,955 A | 9/1982 | Jackson et al. | |
| 4,356,098 A | 10/1982 | Chagnon | |
| 4,424,974 A | 1/1984 | Mitsuya et al. | |
| 4,444,398 A | 4/1984 | Black et al. | |
| 4,502,700 A | 3/1985 | Gowda et al. | |
| 4,526,379 A | 7/1985 | Raj | |
| 4,604,222 A | 8/1986 | Borduz et al. | |
| 4,604,229 A | 8/1986 | Raj et al. | |
| 4,630,243 A | 12/1986 | MacLeod | |
| 4,630,943 A | 12/1986 | Stahl et al. | |
| 4,691,774 A | 9/1987 | Nelson | |
| 4,802,534 A | 2/1989 | Larson et al. | |
| 4,845,988 A | 7/1989 | Russell et al. | |
| 4,865,334 A | 9/1989 | Raj et al. | |
| 4,991,438 A | 2/1991 | Evans | |
| 5,007,513 A | 4/1991 | Carlson | |
| 5,092,611 A | 3/1992 | Ehmsen et al. | |
| 5,429,000 A | 7/1995 | Raj et al. | |
| 5,452,520 A | 9/1995 | Raj et al. | |
| 5,474,302 A | 12/1995 | Black et al. | |
| 5,475,309 A | 12/1995 | Hong et al. | |
| 5,780,741 A | 7/1998 | Raj | |
| 5,850,624 A | 12/1998 | Gard et al. | |
| 6,216,787 B1 | 4/2001 | Ruttley | |
| 6,250,848 B1 * | 6/2001 | Moridis | B09C 1/00 166/292 |
| 6,257,356 B1 | 7/2001 | Wassell | |
| 6,290,894 B1 | 9/2001 | Raj et al. | |
| 6,305,694 B1 | 10/2001 | Yamazumi et al. | |
| 6,681,849 B2 | 1/2004 | Goodson, Jr. | |
| 6,817,415 B2 | 11/2004 | Orban et al. | |
| 7,021,406 B2 | 4/2006 | Zitha | |
| 7,032,670 B2 | 4/2006 | Zitha | |
| 7,063,146 B2 | 6/2006 | Schultz et al. | |
| 7,063,802 B2 | 6/2006 | Tsuda et al. | |
| 7,159,675 B2 | 1/2007 | Eigner et al. | |
| 7,204,581 B2 | 4/2007 | Peeters | |
| 7,219,752 B2 | 5/2007 | Wassell et al. | |
| 7,428,922 B2 | 9/2008 | Fripp et al. | |
| 7,743,825 B2 | 6/2010 | O'Malley et al. | |
| 7,763,175 B2 | 7/2010 | DeCoster et al. | |
| 7,779,933 B2 | 8/2010 | Sihler et al. | |
| 7,950,672 B2 | 5/2011 | Shimazaki et al. | |
| 8,056,246 B1 | 11/2011 | Hopper et al. | |
| 8,136,594 B2 | 3/2012 | Streich et al. | |
| 8,269,501 B2 | 9/2012 | Schmidt et al. | |
| 8,286,705 B2 | 10/2012 | Ocalan et al. | |
| 8,328,199 B2 | 12/2012 | Oshita | |
| 8,360,170 B2 | 1/2013 | Leuchtenberg | |
| 8,419,019 B2 | 4/2013 | Kung | |
| 9,512,698 B2 * | 12/2016 | Donderici | E21B 33/12 |
| 2003/0166470 A1 | 9/2003 | Fripp et al. | |
| 2004/0084184 A1 * | 5/2004 | Orban | E21B 33/13 166/292 |
| 2005/0006020 A1 | 1/2005 | Zitha et al. | |
| 2005/0274524 A1 | 12/2005 | Silguero et al. | |
| 2008/0290876 A1 | 11/2008 | Ameen | |
| 2009/0008078 A1 | 1/2009 | Patel | |
| 2009/0025928 A1 | 1/2009 | Lee | |
| 2009/0101364 A1 | 4/2009 | Schafer et al. | |
| 2009/0179385 A1 | 7/2009 | Komino et al. | |
| 2010/0019514 A1 | 1/2010 | Steinwender | |
| 2010/0126716 A1 | 5/2010 | Joseph | |
| 2010/0224360 A1 | 9/2010 | MacDougall et al. | |
| 2010/0267594 A1 | 10/2010 | Rana et al. | |
| 2011/0056681 A1 | 3/2011 | Khan | |
| 2011/0108277 A1 | 5/2011 | Dudley et al. | |
| 2011/0186297 A1 | 8/2011 | Zhang et al. | |
| 2011/0192573 A1 | 8/2011 | Defretin et al. | |
| 2011/0297265 A1 | 12/2011 | Kahoe et al. | |
| 2011/0297394 A1 | 12/2011 | VanDelden | |
| 2013/0020066 A1 | 1/2013 | Ocalan et al. | |
| 2013/0091941 A1 | 4/2013 | Huh et al. | |
| 2013/0105224 A1 * | 5/2013 | Donderici | G01V 3/30 175/45 |
| 2013/0112911 A1 | 5/2013 | Mazyar et al. | |
| 2013/0119995 A1 | 5/2013 | Wootten | |
| 2013/0139565 A1 | 6/2013 | Hedtke | |
| 2013/0169278 A1 | 7/2013 | Bittar et al. | |
| 2013/0199650 A1 | 8/2013 | Cabot et al. | |
| 2015/0013985 A1 * | 1/2015 | Parsche | E21B 17/18 166/302 |
| 2015/0315868 A1 | 11/2015 | Fripp et al. | |
| 2015/0345250 A1 | 12/2015 | Murphree et al. | |
| 2016/0032688 A1 | 2/2016 | Donderici et al. | |
| 2016/0040507 A1 | 2/2016 | Donderici et al. | |
| 2016/0047204 A1 | 2/2016 | Donderici et al. | |
| 2016/0145968 A1 | 5/2016 | Marya | |

FOREIGN PATENT DOCUMENTS

| | | |
|---|---|---|
| WO | 2001061713 | 8/2001 |
| WO | 2005038189 | 4/2005 |
| WO | 2009142779 | 11/2009 |
| WO | 2013012967 | 1/2013 |
| WO | 2015094266 | 6/2015 |
| WO | 2015094274 | 6/2015 |
| WO | 2015102563 | 7/2015 |
| WO | 2015102566 | 7/2015 |
| WO | 2015102568 | 7/2015 |

OTHER PUBLICATIONS

Gollwitzer et al., The Surface Topography of a Magnetic Fluid—A Quantitative Comparison Between Experiment and Numerical Simulation, Journal of Fluid Mechanics, May 2006, pp. 1-21.

Grundfos , The Centrifugal Pump, Company Datasheet, Dec. 2003, 128 pages.

Horak et al., Experimental and Numerical Determination of the Static Critical Pressure in Ferrofluid Seals, Journal of Physics: Conference Series, vol. 412, 2013, pp. 1-6.

Pant et al., Synthesis and characterization of ferrofluid-conducting polymer composite, Indian Journal of Engineering and Materials Sciences, vol. 11, Aug. 2004., pp. 267-270.

International Patent Application No. PCT/US2013/078249 , International Search Report and Written Opinion, mailed Sep. 29, 2014, 14 pages.

Raj et al., Advances in ferrofluid technology, Journal of Magnetism and Magnetic Materials, vol. 149, 1995, pp. 174-180.

Rosenweig , Magnetic Fluid Motion in Rotating Field, Journal of Magnetism and Magnetic Materials, vol. 85, Issues 1-3, Apr. 1990, pp. 171-180.

* cited by examiner

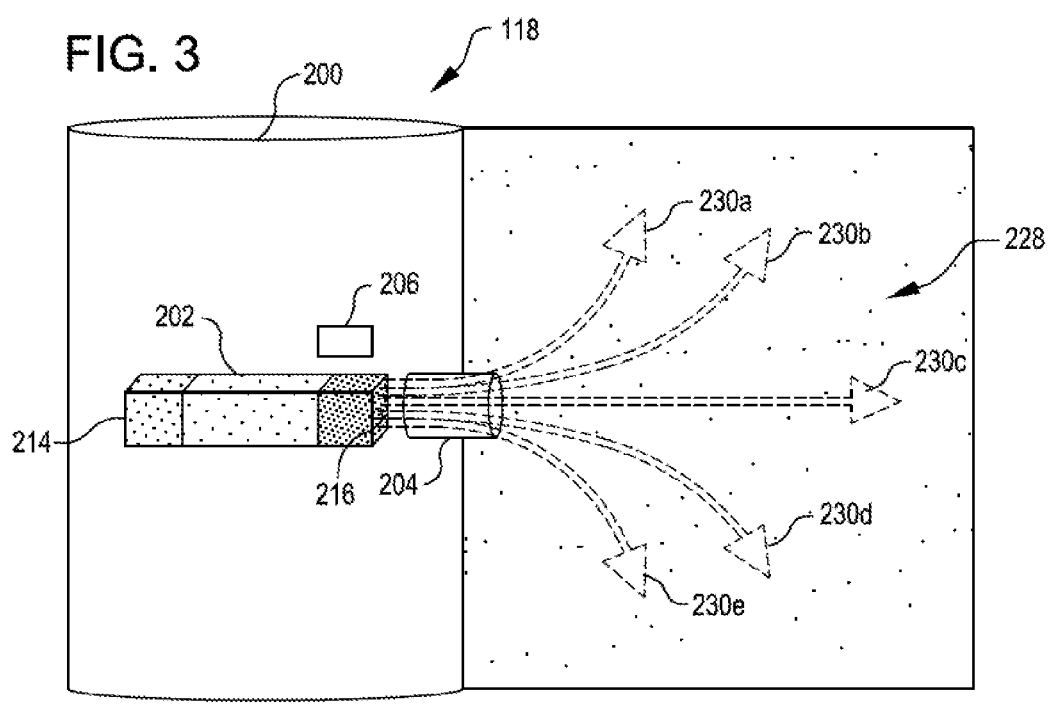
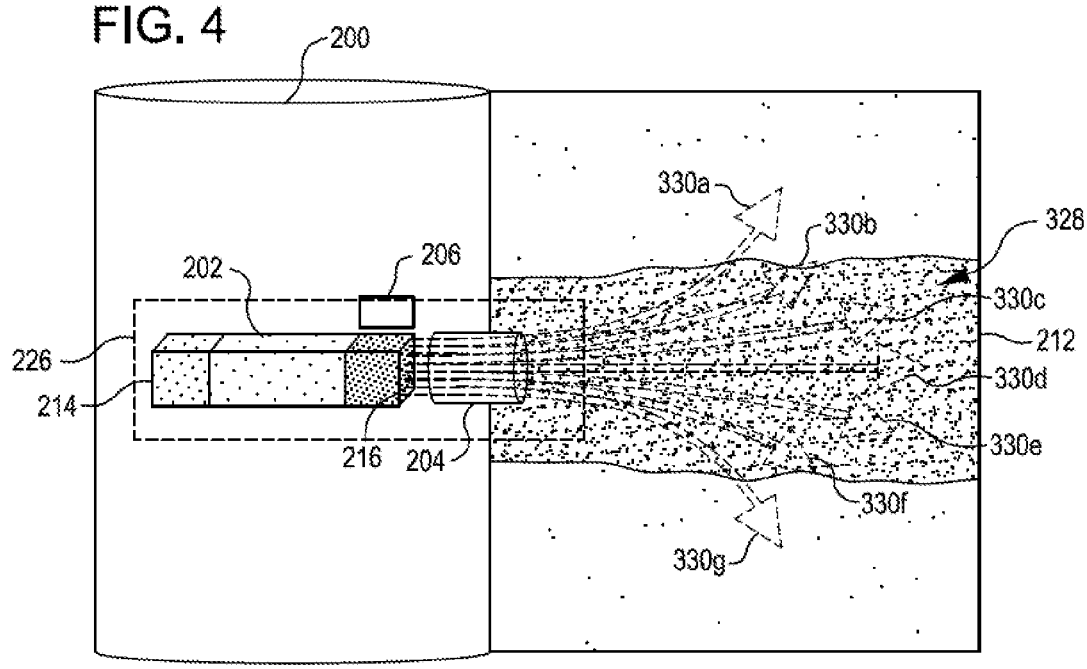

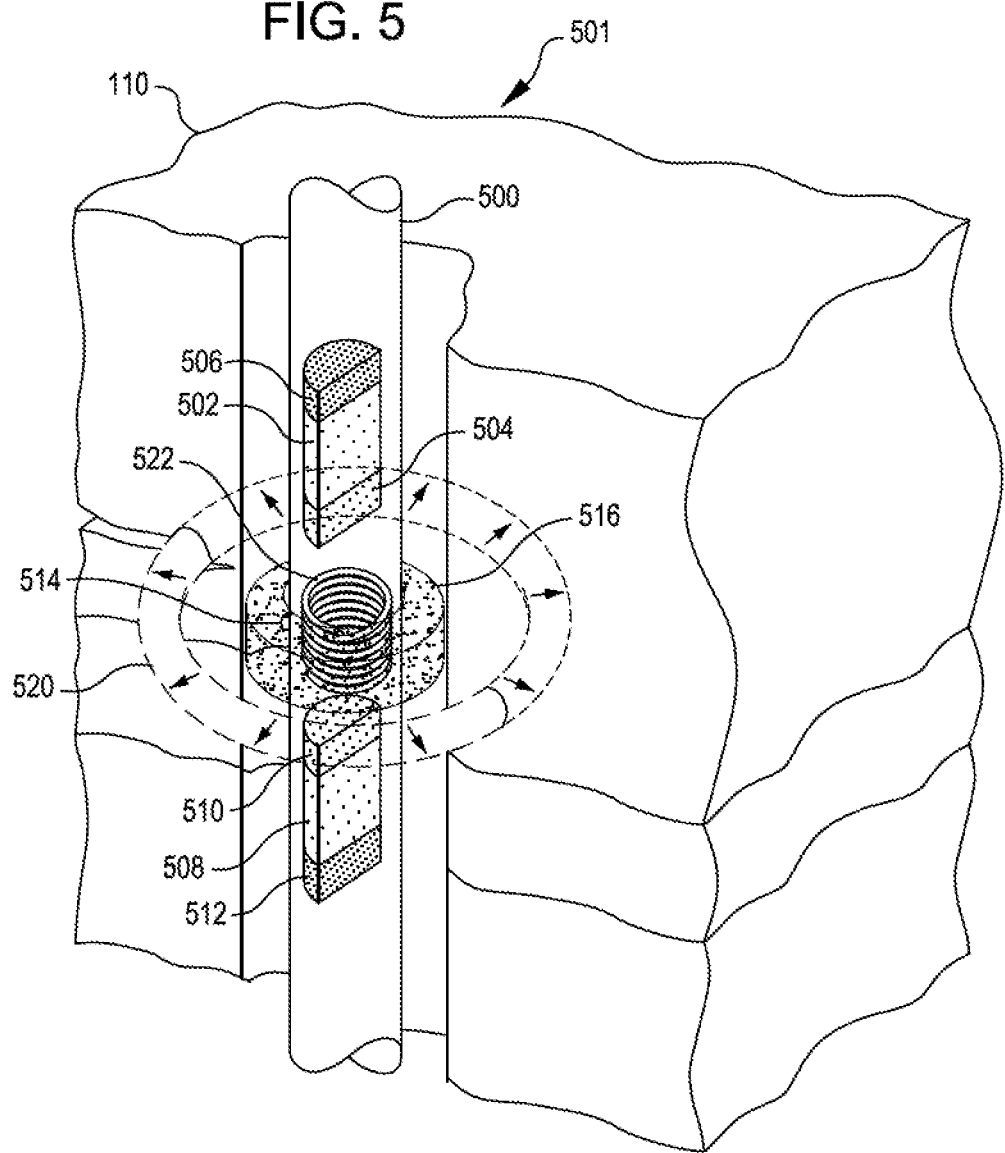

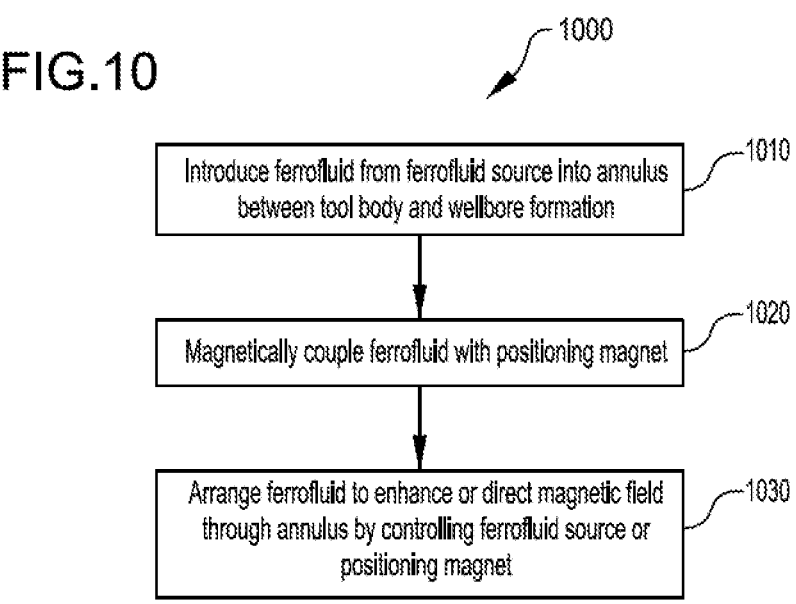

US 9,797,222 B2

FERROFLUID TOOL FOR ENHANCING MAGNETIC FIELDS IN A WELLBORE

CROSS-REFERENCE TO RELATED APPLICATIONS

This is a U.S. national phase under 35 U.S.C. 371 of International Patent Application No. PCT/US2013/078249, titled "Ferrofluid Tool for Enhancing Magnetic Fields in a Wellbore" and filed Dec. 30, 2013, the entirety of which is incorporated herein by reference.

TECHNICAL FIELD

The present disclosure relates generally to devices for use in a wellbore in a subterranean formation and, more particularly (although not necessarily exclusively), to tools for enhancing magnetic fields using ferrofluids.

BACKGROUND

Various devices can be placed in a well traversing a hydrocarbon bearing subterranean formation. Some devices emit magnetic fields, such as static magnetic fields and radio frequency (RF) magnetic fields, into the formation to measure properties of the formation. Fluids in the wellbore can have properties such as electrical conductivity that can negatively affect transmission of magnetic fields into the formation. For example, wellbore fluids can diffuse a transmitted signal and cause losses in magnetic fields communicated into the wellbore. Losses in magnetic fields communicated into the wellbore can reduce efficiency and accuracy of downhole devices.

BRIEF DESCRIPTION OF THE DRAWINGS

FIG. 3 is a cross-sectional view of the magnet of the ferrofluid tool depicted in FIG. 2 showing an illustration of a magnetic field in the absence of ferrofluid according to one aspect of the present disclosure.

FIG. 4 is a cross-sectional view of the magnet of the ferrofluid tool depicted in FIG. 2 showing an illustration of a magnetic field in the presence of ferrofluid according to one aspect of the present disclosure.

FIG. 5 is a cutaway perspective view of an example of a ferrofluid tool with ferrofluid for enhancing an omnidirectional static magnetic field according to one aspect of the present disclosure.

FIG. 10 is a flow chart illustrating an example method for enhancing or directing a magnetic field using ferrofluids in a wellbore according to one aspect of the present disclosure.

DETAILED DESCRIPTION

Figure 1:
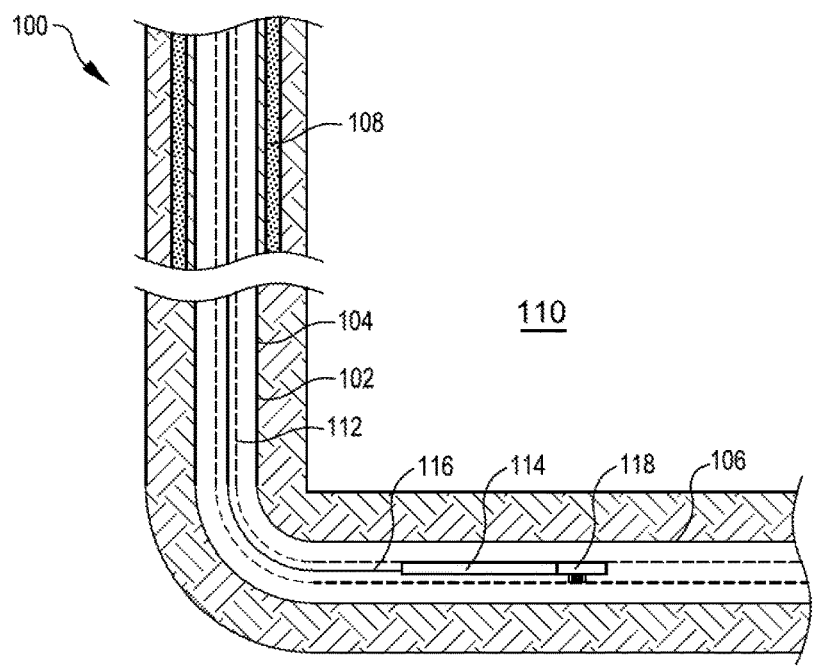
FIG. 1 is a schematic illustration of a well system having a ferrofluid tool according to one aspect of the present disclosure.

Certain aspects of the present disclosure are directed to ferrofluid tools for enhancing magnetic fields using ferrofluids. Ferrofluids, which may also be known as liquid magnets, can include materials for which position, size, and shape can be controlled using external magnetic fields. A ferrofluid tool can include a ferrofluid source for introducing ferrofluid and a magnet for providing a magnetic field. The ferrofluid source or the magnet (or both) can be controlled when the tool is in a wellbore to position the ferrofluid in or near the tool. The ferrofluid can displace wellbore fluid having unknown or problematic magnetic characteristics near the tool. Displacing the wellbore fluid with the ferrofluid, which can have known magnetic characteristics, can enhance magnetic fields used by the tool. For example, magnetic fields can be enhanced by improving directionality of the field, by improving strength of the field, by reducing losses of the field, or a combination of these or other properties.

In one example, ferrofluids can be used to enhance magnetic fields used in Nuclear Magnetic Resonance (NMR) logging tools. NMR logging tools can use a combination of static and Radio Frequency (RF) magnetic fields transmitted into the formation to measure properties of the formation and contained fluids. NMR relaxometry can be used to determine porosity, permeability, fluid typing, viscosity, and rock pore size. NMR tools can include magnets for providing static magnetic fields and transmission antennas, such as induction coils, for providing RF magnetic fields, which can be orthogonal with the static magnetic fields. Pumping ferrofluid material into the borehole can enhance the static magnetic fields or the RF magnetic fields, or both. Ferrofluid adjacent to a magnet for producing a static magnetic field can function as a magnetic pole piece that extends from the tool's surface toward the borehole wall to increase the strength magnitude or focus the directionality of the static magnetic field, or both. Ferrofluid positioned between an antenna for providing RF magnetic fields and the borehole wall can provide a non-conductive path that can reduce the RF energy lost per cycle in comparison to a path through conductive wellbore fluids.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "above," "below," "upper," "lower," "upward," and "downward," etc. in relation to the illustrative aspects as they are depicted in the figures, the upward direction being toward the top of the corresponding figure and the downward direction being toward the bottom of the corresponding figure. Like the illustrative aspects, the numerals and directional descriptions included in the following sections should not be used to limit the present disclosure.

FIG. 1 schematically depicts an example of a well system 100 having a ferrofluid tool 118 that can use ferrofluids to enhance magnetic fields. Although the well system 100 is depicted with one ferrofluid tool 118, any number of ferrofluid tools can be used in the well system 100. The well system 100 includes a bore that is a wellbore 102 extending through various earth strata. The wellbore 102 has a substantially vertical section 104 and a substantially horizontal section 106. The substantially vertical section 104 and the substantially horizontal section 106 can include a casing string 108 cemented at an upper portion of the substantially vertical section 104. The substantially horizontal section 106 extends through a hydrocarbon bearing subterranean formation 110.

A tubing 112 string within the wellbore 102 can extend from the surface to the subterranean formation 110. The tubing 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface.

The ferrofluid tool 118 can be part of a tool string 114. The ferrofluid tool 118 can be the sole tool in the tool string 114, or the tool string 114 can include other downhole tools (including other ferrofluid tools). The tool string 114 can be deployed into the well system 100 on a wire 116. The tool string 114 can be deployed into the tubing 112 or independent of the tubing 112. In some aspects, the tool string 114 can be deployed as part of the tubing 112 and the wire 116 can be omitted. In other aspects, the tool string 114 can be deployed in a portion of a well system 100 that does not include tubing 112.

Although FIG. 1 depicts the ferrofluid tool 118 in the substantially horizontal section 106, the ferrofluid tool 118 can be located, additionally or alternatively, in the substantially vertical section 104. In some aspects, the ferrofluid tool 118 can be disposed in simpler wellbores, such as wellbores having only a substantially vertical section. In some aspects, the ferrofluid tool 118 can be disposed in more complex wellbores, such as wellbores having portions disposed at various angles and curvatures. The ferrofluid tool 118 can be disposed in openhole environments, as depicted in FIG. 1, or in cased wells.

Figure 2:
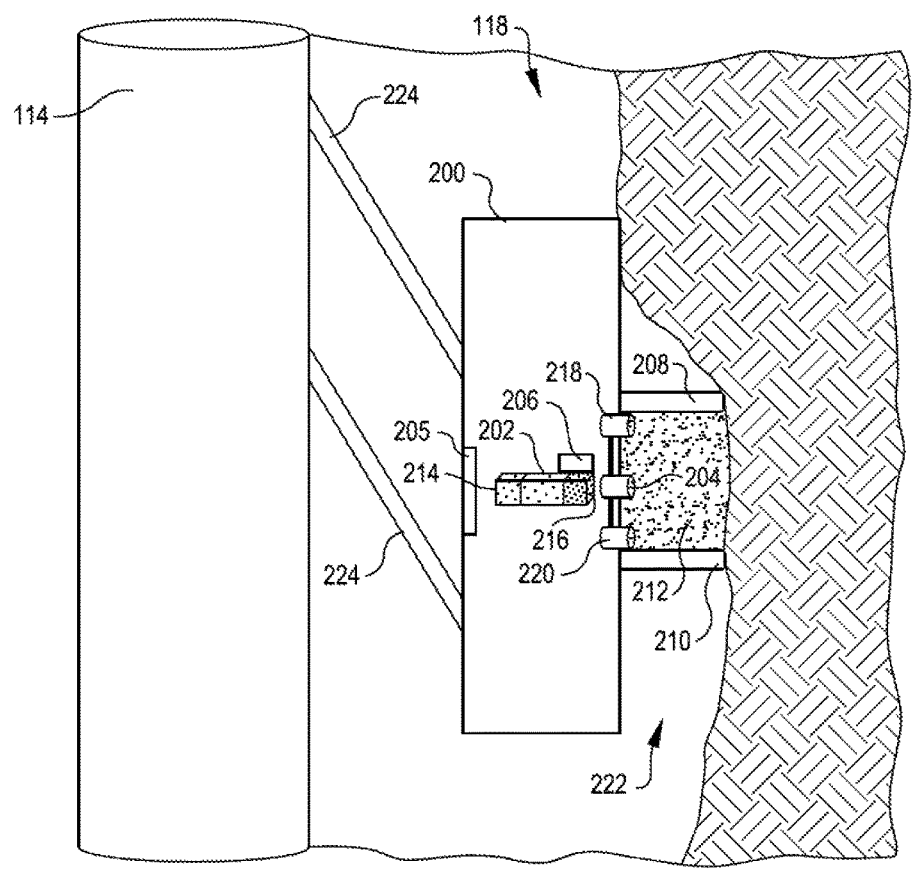
FIG. 2 is a cross-sectional view of an example of a ferrofluid tool for adjusting a magnetic field of a magnet according to one aspect of the present disclosure.

FIG. 2 is a cross-sectional view of an example of a ferrofluid tool 118 for adjusting a magnetic field of a magnet 202 according to one aspect. The ferrofluid tool 118 can include a tool body 200, a magnet 202, a ferrofluid source 204, a sensor 206, an RF device 205, ferrofluid isolators 208, 210, and ferrofluid collectors 218, 220. In some aspects, the ferrofluid source 204, the magnet 202, the sensor 206, the RF device 205, the ferrofluid collectors 222a, 222b, or some combination thereof can be controlled by a system control center in communication with the ferrofluid tool 118.

The tool body 200 can be a component distinct from the tool string 114. For example, the tool body 200 can be positioned at the end of one or more arms 224 (two are shown) extending from the tool string 114 or a mandrel. Positioning the tool body 200 on the one or more arms 224 can reduce a distance between the tool body 200 and a formation 110 to be measured. In some aspects, the tool body 200 can be part of the tool string 114.

The magnet 202 can be positioned in or connected with the tool body 200. For example, the magnet 202 can be on the tool body 200, directly connected to the tool body 200, or connected with the tool body 200 through intervening components or structure. Non-limiting examples of the magnet 202 include an electromagnet, a permanent magnet, and a device for producing magnetic fields. The ferrofluid source 204 can be positioned in or connected with the tool body 200. The ferrofluid source 204 can be located near the magnet 202. In some aspects, the ferrofluid source 204 can include a nozzle or a port (or both). The sensor 206 can be positioned in or connected with the tool body 200 in a position suitable for detecting changes in magnetic fields in and around the ferrofluid tool 118. The RF device 205 can be positioned in or connected with the tool body 200 in a position suitable for transmitting or receiving (or both) RF magnetic fields in and around the ferrofluid tool 118. In some aspects, the sensor 206 can detect magnetic field changes caused by RF magnetic fields transmitted by the RF device 205. The changes can indicate characteristics of a wellbore formation near the ferrofluid tool 118.

The ferrofluid source 204 can introduce ferrofluid 212 into a space between the tool body 200 and the formation 110. The magnet 202 can magnetically couple with the ferrofluid 212. The magnet 202 can exert an external magnetic field upon the ferrofluid 212. The magnetic field exerted on the ferrofluid 212 can cause the ferrofluid 212 to align with the magnetic field. The presence of the ferrofluid 212 can modify the magnetic field. The magnetic field can position the ferrofluid 212 between the tool body 200 and the formation 110. The ferrofluid 212 can be positioned adjacent to one or more poles 214, 216 of the magnet 202 in a shape protruding from the face of the tool body 200.

Ferrofluid isolators 208, 210 can be connected with the tool body 200. A first ferrofluid isolator 208 can be positioned adjacent to the source 204 in one direction along the tool body 200. A second ferrofluid isolator 210 can be positioned adjacent to the source 204 in another direction along the tool body 200. For example, the first ferrofluid isolator 208 can be positioned above the source 204, while the second ferrofluid isolator 210 can be positioned below the source 204. In another example, the first ferrofluid isolator 208 can be positioned horizontally along the tool body 200 to the left of the source 204, while the second ferrofluid isolator 210 can be positioned horizontally along the tool body 200 to the right of the source 204.

The magnet 202 can include a first pole 216 and a second pole 214 having opposite polarities. Magnetic particles in the ferrofluid 212 can align with the magnetic field of the magnet 202 such that the ferrofluid 212 can be attracted toward either pole 214, 216. The attraction toward both poles 214, 216 can cause the ferrofluid 212 to tend to spread out along the face of the tool body 200 to follow the minimum magnetic path length between the two poles 214, 216. The ferrofluid isolators 208, 210 can obstruct the path of the ferrofluid 212 and prevent the ferrofluid 212 from spreading out along the face of the tool body 200. The ferrofluid isolators 208, 210 can retain the ferrofluid 212 in the magnetic field of the magnet 202 in a shape protruding from the face of the tool body 200 and defined between the ferrofluid isolators 208, 210.

Ferrofluid isolators 208, 210 can be constructed of material having low magnetic permeability. An example of material from which the ferrofluid isolators 208, 210 can be constructed includes rubber. The ferrofluid isolators 208, 210 can be used to guide the ferrofluid 212 from the ferrofluid source 204. For example, the ferrofluid isolators 208, 210 can be positioned, respectively, above and below the ferrofluid source 204 such that the ferrofluid 212 is substantially retained in a vertical region between the ferrofluid isolators 208, 210. In another example, the ferrofluid isolators 208, 210 can be positioned, respectively, to the left and right of the ferrofluid source 204 such that the ferrofluid 212 is substantially retained in a horizontal region between the ferrofluid isolators 208, 210. Any number, shape, or arrangement (or combination thereof), of ferrofluid isolators 208, 210 can be used to retain ferrofluid 212 in a region bounded by a ferrofluid isolator 208, 210.

The ferrofluid collectors 218, 220 can be positioned in or connected with the tool body 200. In some aspects, the collectors 218, 220 can include nozzles or ports (or both). The ferrofluid collectors 218, 220 can collect ferrofluid 212 from an annulus 222 between the tool body 200 and the formation 110. Additional magnets (not shown) located near the ferrofluid collectors 218, 220 can be used to attract the ferrofluid 212 to the ferrofluid collectors 218, 220. The ferrofluid collectors 218, 220 can convey collected ferrofluid 212 to the ferrofluid source 204. Use of ferrofluid collectors 218, 220 can decrease an amount of ferrofluid 212 used by the ferrofluid tool 118.

In some aspects, collection of ferrofluid 212 by the ferrofluid collectors 218, 220 contributes to the shape of the ferrofluid 212 protruding from a face of the tool body 200. The first ferrofluid collector 218 can be positioned adjacent to the source 204 in one direction along the tool body 200. The second ferrofluid collector 220 can be positioned adjacent to the source 204 in another direction along the tool body 200. For example, the first ferrofluid collector 218 can be positioned above the source 204, while the second ferrofluid collector 220 can be positioned below the source 204. The ferrofluid collectors 218, 220 can recover ferrofluid 212 from above and below the source to retain the ferrofluid in the shape protruding from the face of the tool body 200.

The ferrofluid 212 can have particular magnetic characteristics. For example, the ferrofluid can have low reluctance or high magnetic permeability. A low reluctance ferrofluid 212 positioned adjacent to the magnet 202 in a shape protruding from the face of the tool body 200 can act as a magnetic pole piece for the magnet 202. The ferrofluid 212 acting as a magnetic pole piece for the magnet 202 can alter characteristics of the magnetic field provided by the magnet 202. For example, the ferrofluid 212 can extend a length of the magnetic field, enhance a strength of the magnetic field at a target measurement location, affect a direction of the magnetic field, or some combination thereof.

FIG. 3 is a cross-sectional view of the magnet 202 of the ferrofluid tool 118 depicted in FIG. 2 showing an illustration of a magnetic field 228 in the absence of ferrofluid 212 according to one aspect. The magnet 202 can be positioned in the tool body 200 near the ferrofluid source 204. The magnet 202 can produce a static magnetic field 228. The static magnetic field 228 can be represented by flux lines 230a-230e that emanate from the first pole 216. The flux lines 230a-230e can correspond to portions of magnetic field lines that travel between the first pole 216 and the second pole 214 of the magnet 202. The flux lines 230a-230e can have a curvature in which the flux lines 230a-230e curve away from the first pole 216 toward the second pole 214. The curvature of the flux lines 230a-230e can be quantitatively represented by a first radius of curvature.

FIG. 4 is a cross-sectional view of the magnet 202 of the ferrofluid tool 118 depicted in FIG. 2 showing an illustration of a magnetic field 328 in the presence of ferrofluid 212 according to one aspect. The ferrofluid source 204 can provide ferrofluid 212 to a position adjacent to the magnet 202. The ferrofluid 212 can be positioned adjacent to the magnet 202 in a shape protruding from the face of the tool body 200. In some aspects, the ferrofluid 212 is arranged adjacent to the magnet 202 by the magnet 202. In other aspects, the ferrofluid 212 is arranged adjacent to the magnet 202 by positioning magnets provided in addition to the magnet 202.

The ferrofluid 212 protruding from the face of the tool body 200 and positioned adjacent to the magnet 202 can act as a magnetic pole piece for the magnet 202. The ferrofluid 212 can have a low reluctance in some aspects. The magnet 202 can produce a static magnetic field 328 having flux lines 330a-330g that travel through the ferrofluid 212. The low reluctance of the ferrofluid 212 can direct the flux lines 330a-330g through the ferrofluid 212. Directing the static magnetic field 328 through the low reluctance ferrofluid 328 can affect the magnetic field 328 of the magnet 202. For example, the flux lines 330a-330g can have a second radius of curvature larger than the first radius of curvature of the flux lines 230a-230e. The combination of the magnet 202 and the adjacent ferrofluid 212 can act as an effective magnet 226, i.e., provide a magnetic field 328 similar to what would be produced by a magnet having a greater length than the magnet 202. The magnetic field 328 (depicted in FIG. 4) provided by the combination of the magnet 202 and the adjacent ferrofluid 212 can be different from the magnetic field 228 (depicted in FIG. 3) produced by the magnet 202 in the absence of the ferrofluid 212.

Using ferrofluid 212 to adjust the magnetic field of the magnet 202 can provide a magnetic field 328 (depicted in FIG. 4) having a greater strength at a target location than a magnetic field 228 (depicted in FIG. 3) provided by the magnet 202 in the absence of ferrofluid 212. The combination of the ferrofluid 212 and the magnet 202 can also provide a magnetic field 328 (depicted in FIG. 4) that is more focused in a particular direction than a magnetic field 228 (depicted in FIG. 3) provided by the magnet 202 in the absence of ferrofluid 212. A greater magnitude of strength of a magnetic field 328 or a more focused direction of a magnetic field 328 (or both) can improve readings made by the sensor 206 or reduce the amount of energy expended to obtain useable readings by the sensor 206 (or both). Non-limiting examples of improvements of readings made by the sensor 206 include improvements to signal-to-noise ratios, logging speed, magnetic gradient, depth of penetration, porosity, formation fluid porosity, and fluid typing.

Other types of ferrofluid tools can be used alternatively or additionally in the well system 100 depicted in FIG. 1. FIG. 5 is a cutaway perspective view of an example of a ferrofluid tool 501 with ferrofluid 516 for enhancing an omnidirectional static magnetic field 520 according to one aspect.

The ferrofluid tool 501 can include a tool body 500, a first magnet 502, a second magnet 508, a coil antenna 522, and a ferrofluid source 514. Magnets 502, 508 can be arranged such that the first end 504 of the first magnet 502 is facing the first end 510 of the second magnet 508. The first ends 504 and 510 can have the same polarity. The second end 506 of the first magnet 502 can have the same polarity as the second end 512 of the second magnet 508. The magnets 502, 508 can be arranged such that the second ends 506 and 512 are facing away from one another. The magnets 502, 508 can be aligned such that a magnet polarization vector of the first magnet 502 is aligned along the axis of the tool and in an opposite direction to a magnet polarization vector of the second magnet 508. This configuration can provide a static magnetic field 520 having a radial pattern in the region between the magnets 502, 508. The static magnetic field 520 can extend into the formation 110. The static magnetic field 520 in the formation 110 can be used for measuring properties of the formation 110. For example, a NMR logging tool can use the radially oriented static magnetic field 520 to produce a resonant or sensitive volume in the formation 110. The NMR logging tool can transmit a RF magnetic signal (e.g., via the coil antenna 522) into the sensitive volume and detect a response within the sensitive volume. The response can indicate properties of the formation 110 and contained fluids.

The ferrofluid source 514 can introduce ferrofluid 516 adjacent to the ferrofluid tool 501. The ferrofluid 516 can be arranged in an annular ring pattern around the tool body 501. In some aspects, the radial magnetic field 520 can arrange the ferrofluid 516 in the annular ring pattern. In other aspects, the annular ring pattern of the ferrofluid 516 can be caused by magnets other than the magnets 502, 508 that produce the radially oriented static magnetic field 520. In some aspects, the annular ring pattern of the ferrofluid 516 is a radially omnidirectional shape. One example of a radially omnidirectional shape is a toroid. The radially omnidirectional shape of the ferrofluid 516 can provide a low reluctance path in all radial directions for the radially oriented static magnetic field 520. In some aspects, the ferrofluid 516 can provide a low reluctance path for fewer than all radial directions of the static magnetic field 520. In one example, the ferrofluid 516 can be retained along one quarter of the circumference of the tool body 500 such that the ferrofluid 516 only provides a low reluctance path in one quarter of all radial directions.

Providing a low reluctance path of ferrofluid 516 can enhance the static magnetic field 520. In one example, providing a low reluctance path of ferrofluid 516 can increase the strength of the static magnetic field 520 in the sensitive volume. Increasing the strength of the static magnetic field 520 in the sensitive volume can improve readings for an NMR tool. In another example, providing a low reluctance path of ferrofluid 516 can allow the sensitive volume to be placed deeper into the formation 110 without changing a nuclear resonant frequency of the RF magnetic signal transmitted into the formation.

In some aspects, the ferrofluid 516 can span between the tool body 500 and the formation 110. The ferrofluid 516 may exclude wellbore fluid from the space spanned by the ferrofluid 516. Excluding wellbore fluid can reduce RF signal losses due to wellbore fluid conductivity. Reducing RF signal losses can increase a measurement quality factor and improve a signal-to-noise ratio. Improving the signal-to-noise ratio can improve the accuracy of tools that are using the RF signals, such as NMR tools. Reducing RF signal losses can also reduce an amount of energy expended to produce RF signals that cause a measurable response.

Figure 6:
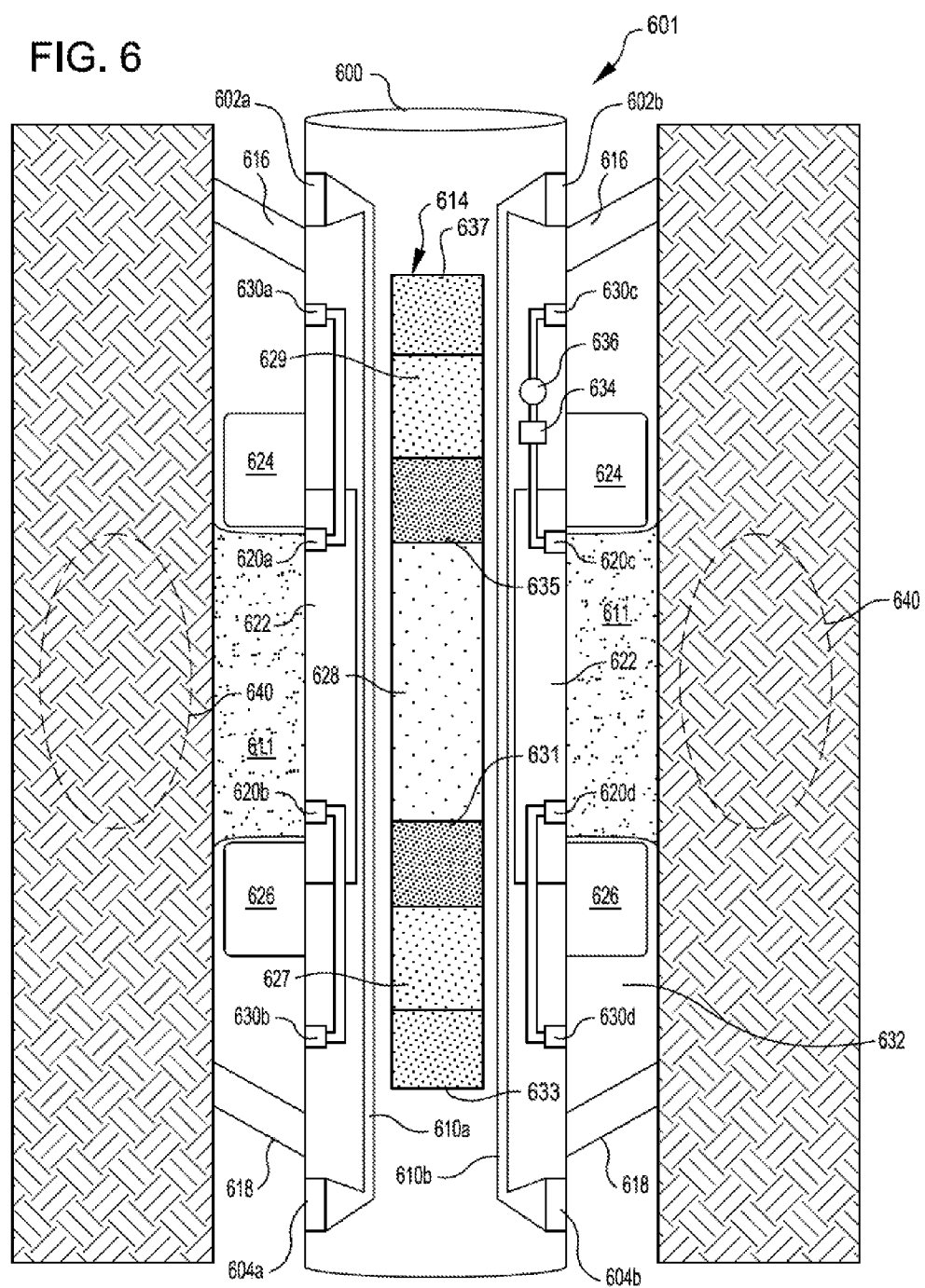
FIG. 6 is a cross-sectional view of an example of a ferrofluid tool with ferrofluid for enhancing an omnidirectional static magnetic field according to one aspect of the present disclosure.

FIG. 6 is a cross-sectional view of an example of a ferrofluid tool 601 with ferrofluid 611 for enhancing an omnidirectional static magnetic field 640 according to one aspect.

Ferrofluid tool 601 can include a tool body 600, one or more mud-flow passageways 610, a magnet block 614, an upper mud baffle 616, a lower mud baffle 618, one or more ferrofluid sources 620, one or more antennas 622, and ferrofluid isolators 624, 626. The lower mud baffle 618 can be positioned between the tool body 600 and the formation 110 wall. The lower mud baffle 618 can provide an annular barrier around the tool body 600 to prevent flow of wellbore fluids past the lower mud baffle 618 along an annulus between the tool body 600 and the formation 110. The lower mud baffle 618 can prevent flow of wellbore fluids upward. The upper mud baffle 616 can be positioned to prevent the flow of wellbore fluids downward past the upper mud baffle 616 into an annulus between the tool body 600 and the formation 110. With the mud baffles 616, 618 so configured, wellbore fluid can be at least partially prevented from entering a sheltered region 632 of the annulus defined between the upper mud baffle 616 and the lower mud baffle 618.

The one or more mud-flow passageways 610 can be positioned internal to the tool body 600. Each mud-flow passageway 610 can include a lower opening 604 and an upper opening 602. Each mud-flow passageway 610 can provide a flow path for wellbore fluid to pass between a position below the lower mud baffle 618 and a position above the upper mud baffle 616. For example, the lower mud baffle 618 can divert a flow of wellbore fluid through the lower opening 604a of a mud-flow passageway 610a. The wellbore fluid can flow through the tool body 600 via the mud-flow passageway 610a. Wellbore fluid can exit the mud-flow passageway 610a via the upper opening 602a. Wellbore fluid exiting the upper opening 602a of the mud-flow passageway 610a can reenter the annulus above the upper mud baffle 616. Flow of wellbore fluids through the tool body 600 via a mud-flow passageway 610 can reduce an amount of wellbore fluid entering the sheltered region 632 in between the upper mud baffle 616 and the lower mud baffle 618. Reducing the amount of wellbore fluid that can enter the sheltered region 632 between the mud baffles 618, 616 can reduce a flow of wellbore fluids exerted against ferrofluid 611 emitted from the ferrofluid source 620.

The magnet block 614 can include a first magnet 627, a second magnet 629, and a magnetic yoke 628. The first magnet 627 can include a first pole 631 having the same polarity as a first pole 635 of the second magnet 629. The first magnet 627 can also include a second pole 633 having the same polarity as a second pole 637 of the second magnet 629. The first magnet 627 and the second magnet 629 can be positioned opposite one another with poles of the same polarity (such as first poles 631, 635) pointing together. The magnet block 614 can produce an elongated magnetic field 640 around the tool body 600, such as the static magnetic field 520 described with reference to FIG. 5 above. The first magnet 627 and the second magnet 629 can be joined by the magnetic yoke 628. The magnetic yoke 628 can be constructed of a material having a high magnetic permeability. The permeability of the magnetic yoke 628 can shape magnetic flux lines of the magnetic field produced by the first magnet 627 and the second magnet 629. For example, the magnetic yoke 628 can focus the magnetic flux lines in the radial direction.

The ferrofluid sources 620a, 620b, 620c, 620d, can introduce ferrofluid 611 into the sheltered region 632. The ferrofluid 611 can displace wellbore fluid in the sheltered region 632. The ferrofluid 611 can align between the tool body 600 and the formation 110 in response to a magnetic field. The magnet block 614 can produce the magnetic field that aligns the ferrofluid 611. The ferrofluid 611 can shape magnetic flux lines of the magnetic field produced by the first magnet 627 and the second magnet 629. For example, the ferrofluid 611 can supplement the focusing provided by the magnetic yoke 628 by continuing to direct the magnetic flux lines in the radial direction and into the formation 110.

Ferrofluid isolators 624 and 626 can retain the ferrofluid 611 in the magnetic field that aligns the ferrofluid 611. Ferrofluid collectors 630 can recover ferrofluid 611 from the sheltered region. In some aspects, ferrofluid collectors 630 are positioned for collecting ferrofluid 611 that passes ferrofluid isolators 624, 626. The ferrofluid collectors 630 can be positioned near magnetic poles (such as the second poles 637, 633) of the magnets 627, 629 to facilitate attraction of ferrofluid toward the collectors 630 for collecting ferrofluid 611. In some aspects, the ferrofluid collectors 630a-d can communicate collected ferrofluid 611 to one or more ferrofluid sources 620a-d associated with the ferrofluid collectors 630a-d. In some aspects, the ferrofluid tool 601 can include a tank 634. The tank 634 can store ferrofluid 611 communicated by the ferrofluid source 604 or store ferrofluid collected by the collectors 630 or both. In some aspects, the ferrofluid tool 601 can include a filter 636 for separating collected ferrofluid 611 from collected wellbore fluids.

The one or more antennas 622 can be used for generating RF magnetic fields. Non-limiting examples of an antenna 622 include a coil wrapped around or within a perimeter of the tool body 600 and other RF devices capable of receiving or transmitting (or both) RF magnetic fields. The antennas 622 can be positioned adjacent to the ferrofluid 611 arranged adjacent to the tool body 600. The ferrofluid 611 can be arranged in an arrangement spanning between the tool body 600 and the formation 110. The RF magnetic fields generated by the antennas 622 can transmitted into the formation through the aligned ferrofluid 611. The RF magnetic fields transmitted into the formation can intersect with the static magnetic field 640 positioned in the sensitive volume. The RF magnetic field can be pulsed with a relatively low duty cycle. The low duty cycle of the RF magnetic field can allow the RF magnetic field to travel through the ferrofluid 611 without disrupting the position of the ferrofluid 611. The density of the ferrofluid 611 and the holding force of the static magnetic field from the magnet block 614 can affect whether or not the RF magnetic field will disrupt the position of the ferrofluid 611.

Figure 7:
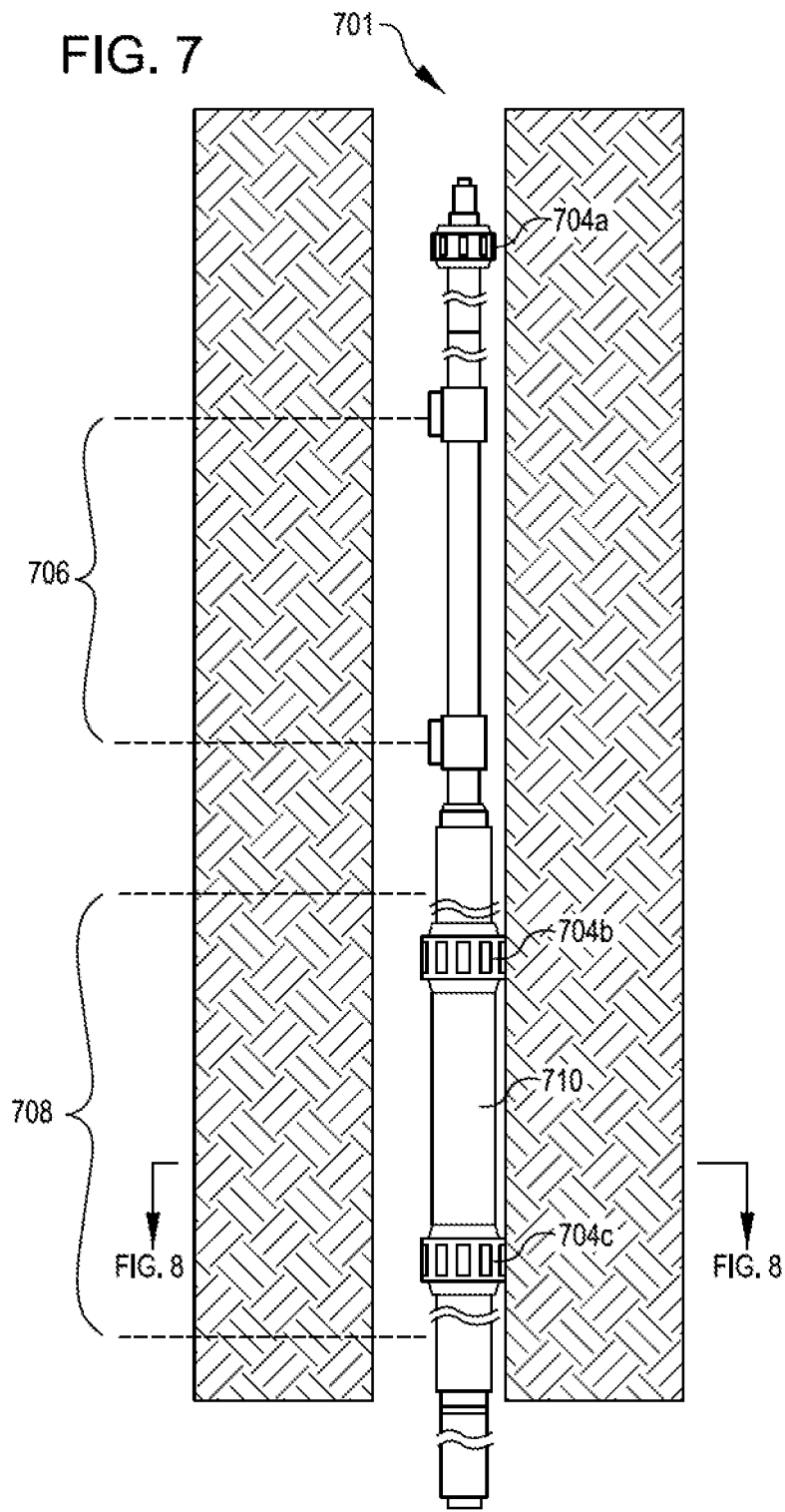
FIG. 7 is a side perspective view of an example of a ferrofluid tool for enhancing a RF magnetic field in a wellbore according to one aspect of the present disclosure.

FIG. 7 is a side perspective view of an example of a ferrofluid tool 701 for enhancing a RF magnetic field in a wellbore according to one aspect. The ferrofluid tool 701 can include one or more stand-offs 704, an electronics section 706, a magnet section 708, and an antenna section 710. The tool 701 can be positioned adjacent to one side of the borehole. Stand-offs 704 can be shaped such that the stand-offs 704 contact the borehole wall and prevent adjacent sections of the tool 701 from contacting the borehole wall. For example, the stand-offs 704 can be a different diameter than adjacent sections of the tool 701, such as the electronics section 706, the magnet section 708, or the antenna section 710. The stand-offs 704 can allow the tool 701 to be operated eccentrically, along one side of the borehole.

Figure 8:
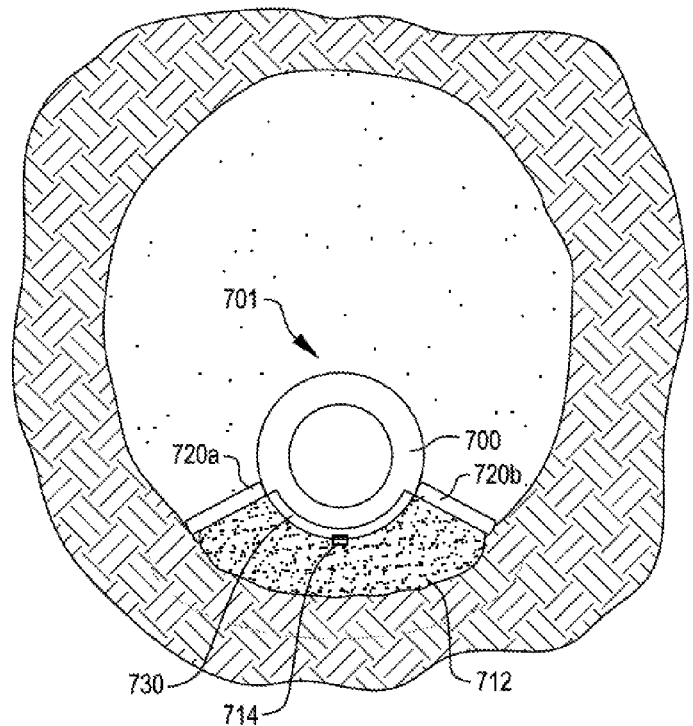
FIG. 8 is a top cross-sectional view of the ferrofluid tool of FIG. 7 according to one aspect of the present disclosure.

FIG. 8 is a top cross-sectional view of the ferrofluid tool 701 of FIG. 7 according to one aspect. The ferrofluid tool 701 can include a tool body 700, a ferrofluid source 714, a sensor 730, a first ferrofluid isolator 720a, and a second ferrofluid isolator 720b.

The ferrofluid source 714 can introduce a ferrofluid 712. The ferrofluid 712 can be aligned in a radial pattern, such as by the magnet block 614 described above with reference to FIG. 6. The first ferrofluid isolator 720a and the second ferrofluid isolator 720b can be positioned along opposite edges of the sensor 730 (such as a sonde) such that the ferrofluid 712 is maintained along a face of the tool body 700 adjacent to the sensor 730 and between the first ferrofluid isolator 720a and the second ferrofluid isolator 720b. The tool 701 can be positioned in the borehole such that wellbore fluids can flow freely on the back side of the tool body 700. The sensor 730 can be positioned within a sheltered region on a front side of the tool body 700. The wellbore fluids can be diverted near the top and bottom of the sheltered region using isolators or baffles such as the ferrofluid isolators 208, 210 or the mud baffles 616, 618 described above. The wellbore fluids can be diverted away from the left and right lateral ends of the sheltered region by the first ferrofluid isolator 720a and the second ferrofluid isolator 720b. Diverting the wellbore fluids from the sheltered region along the tool body 700 can reduce effects of the flow of wellbore fluid on ferrofluid 712 introduced into the sheltered region. The ferrofluid 712 positioned in the sheltered region can enhance magnetic fields from the tool 701 as described above.

Figure 9:
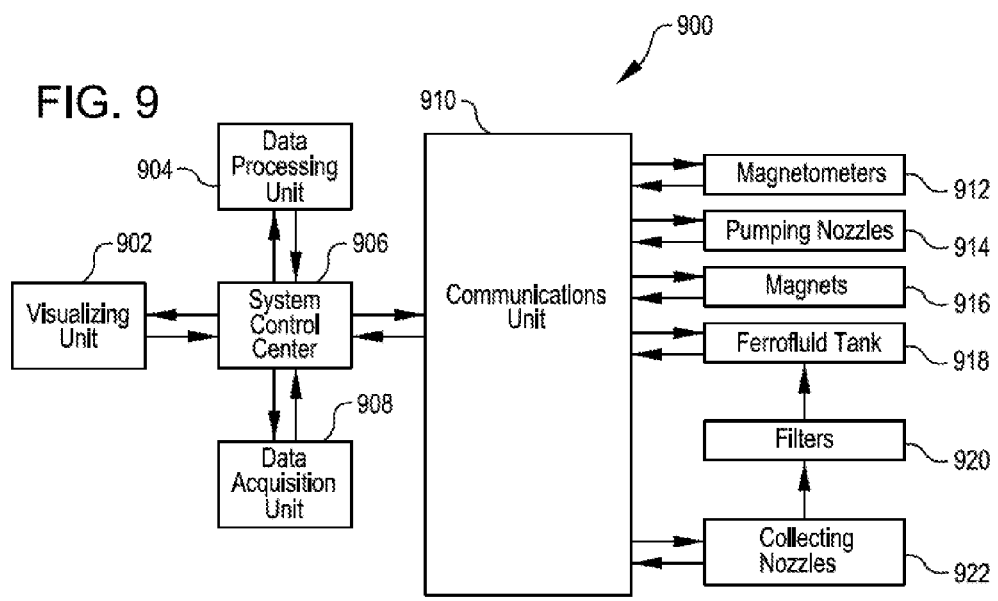
FIG. 9 is a block diagram depicting an example of a system for using ferrofluid to enhance magnetic fields according to one aspect of the present disclosure.

FIG. 9 is a block diagram depicting an example of a system 900 for using ferrofluid to enhance magnetic fields according to one aspect. The system 900 can include a system control center 906, a visualizing unit 902, a data processing unit 904, a data acquisition unit 908, a communications unit 910, magnetometers 912, pumping nozzles (or other ferrofluid sources) 914, magnets 916, ferrofluid tank 918, filters 920, and collecting nozzles (or other ferrofluid collectors) 922. System 900 can include more or fewer than all of these listed components. Some of these listed components can be located in the electronics section 706 depicted in FIG. 7.

The system control center 906 can control the operation of the system 900 for enhancing magnetic fields of a tool positioned in the wellbore. The system control center 906 can include a processor device and a non-transitory computer-readable medium on which machine-readable instructions can be stored. Examples of non-transitory computer-readable medium include random access memory (RAM) and read-only memory (ROM). The processor device can execute the instructions to perform various actions, some of which are described herein. The actions can include, for example, communicating with other components of the system 900.

The system control center 906 can communicate via the communications unit 910. For example, the system control center 906 can send commands to initiate the pumping nozzles 914 via the communications unit 910. The communications unit 910 can also communicate information about components to the system control center 906. For example, the communications unit 910 can communicate a status of the pumping nozzle 914, such as pumping or not, to the system control center 906.

The system control center 906 can receive information via communications unit 910 from magnetometers 912. Magnetometers 912 can be configured to detect a presence of ferrofluids in the annulus. For example, the magnetometers 912 can detect a level of ferrofluid introduced into the annulus by the ferrofluid source or pumping nozzle 914. The magnetometer 912 can also detect a level of ferrofluid at a position away from the pumping nozzle 914 to detect a level of ferrofluid that has escaped from the magnetic field of magnets 916. The system control center 906 can also communicate via the communications unit 910 with the magnetometers 912. For example, the system control center 906 can send instructions for the magnetometers 912 to initiate or terminate detection.

The system control center 906 can also communicate via the communications unit 910 with the magnets 916. For example, the system control center 906 can send instructions to initiate or terminate magnetic fields provided by the magnet 916. For example, the magnet 916 can be an electromagnet and the system control center 906 can provide instructions regarding whether to provide current to the electromagnet to cause the electromagnet to produce a magnetic field. The system control center 906 can also communicate with the magnets 916 to provide instructions to move the magnets 916 or adjust the magnetic field produced by the magnets 916. Movement of the magnets 916 or the magnetic field produced by the magnets 916 can provide additional control over ferrofluids positioned in the wellbore. Additional control over the ferrofluids in the wellbore can provide additional control over magnetic fields from the tool. The magnet 916 can also communicate with the system control center 906 via the communications unit 910, such as regarding the strength of the magnetic field the magnet 916 is producing.

The system control center 906 can also communicate via the communications unit 910 with the collecting nozzles 922. For example, the system control center 906 can send instructions to the collecting nozzles 922 to initiate collection of ferrofluids from the wellbore. The system control center 906 can initiate the collecting nozzles 922 based on information received from the magnetometers 912, the pumping nozzles 914, the magnets 916, or any combination thereof. The communications unit 910 can also communicate information about the collecting nozzles 922 to the system control center 906. For example, the communications unit 910 can communicate a status of the collecting nozzle 922, such as pumping or not, or how much ferrofluid is being collected by the collecting nozzle 922.

The system control center 906 can also communicate via the communications unit 910 with the ferrofluid tank 918. For example, the system control center 906 can receive information from the ferrofluid tank 918 regarding the status of the ferrofluid tank 918, such as how full the ferrofluid tank 918 is. The system control center 906 can also initiate or terminate collection by the collecting nozzles 922 based on the information received from the ferrofluid tank 918. The system control center 906 can provide instructions to the ferrofluid tank 918 to initiate filling of the ferrofluid tank 918 from another source distinct from the collecting nozzles 922, such as from a line for refilling the ferrofluid tank 918 from the surface.

One or more filters 920 can be provided to separate ferrofluid from wellbore fluid in the fluid that has been collected by collecting nozzles 922. The filter 920 can communicate collected ferrofluid into the ferrofluid tank 918. The system control center 906 can also communicate with the filter 920 via communications unit 910. For example, the system control center 906 can send instructions to the filter 920 regarding whether the filter 920 is to perform its filtering function based on the information received by the magnetometers 912, the collecting nozzles 922, etc. The communications unit 910 can also communicate information about the filters 920 to the system control center 906. For example, the communications unit 910 can communicate a status of the filters 920 (such as filtering or not), how much ferrofluid is being filtered by the filters 920, or whether the filters 920 need to be changed or not.

The system control center 906 can also be in communication with a data acquisition unit 908. The data acquisition unit 908 can acquire data from any of the units depicted in FIG. 9 or any other sensors that are included in the system 900.

The system control center 906 can also be in communication with a data processing unit 904. The data processing unit 904 can include a processor device and a non-transitory computer-readable medium on which machine-readable instructions can be stored. The processor device can execute the instructions to perform various actions, some of which are described herein. As a non-limiting example, the data processing unit 904 can process data acquired by the data acquisition unit 908. For example, the data processing unit 904 can provide information based on acquired data that is used for determining whether to activate pumping nozzles 914, operate magnets 916, or operate collecting nozzles 922, or any combination thereof. In some aspects, the data processing unit 904 and the system control center 906 can use the same processor, the same non-transitory computer-readable medium, or both.

The system control center 906 can also be in communication with a visualizing unit 902. The visualizing unit 902 can provide an interface for an operator of the system to check system operation and input intervening commands if necessary. Such intervening commands can override default or preset conditions earlier entered or used by the system control center 906.

Visualizing unit 902, data processing unit 904, system control center 906, data acquisition unit 908, and communications unit 910 can be positioned or located at the surface of a well system 100. Alternatively, one or multiple of these components can also be located in a tool positioned within a wellbore rather than at the surface.

FIG. 10 is a flow chart illustrating an example method 1000 for enhancing or directing a magnetic field using ferrofluids in a wellbore according to one aspect of the present disclosure. The method can include introducing ferrofluid from a ferrofluid source into an annulus, as shown in block 1010. The ferrofluid source can be part of a downhole system having a tool body, the ferrofluid source, and a positioning magnet. The annulus can be defined between the tool body and a wellbore formation. For example, a ferrofluid tool such as ferrofluid tool 118 (described above with respect to FIGS. 1-4) can be utilized in the method 1000.

The method can include magnetically coupling the ferrofluid with the positioning magnet, as shown in block 1020. The method can include arranging the ferrofluid to enhance or direct a magnetic field through at least a portion of the annulus by controlling at least one of the ferrofluid source or the positioning magnet, as shown in block 1030.

A ferrofluid can be a substance in which ferromagnetic particles are suspended in a carrier liquid. A ferrofluid can be a solution in which ferromagnetic particles are a solute dissolved in a carrier liquid solvent. The ferromagnetic particles in a ferrofluid can move freely inside the carrier liquid without settling out of the carrier liquid. The ferromagnetic particles inside a ferrofluid can be randomly distributed in the absence of an external magnetic field such that there is no net magnetization. Applying an external magnetic field to a ferrofluid can cause magnetic moments of the ferromagnetic particles to align with the external magnetic field to create a net magnetization. A shape or position (or both) of a ferrofluid can be controlled by changing a strength or a gradient (or both) of an external magnetic field applied to the ferrofluid.

Surfactants can be used in manufacturing ferrofluids. Surfactants can prevent ferromagnetic particles from adhering together, which can otherwise cause the ferromagnetic particles to form heavier clusters that could precipitate out of the solution.

Many different combinations of ferromagnetic particle, surfactant, and carrier fluid can be utilized to produce a ferrofluid. The variety of combinations can provide extensive opportunities to optimize the properties of a ferrofluid to a particular application. In one example, appropriate selection of the materials composing a ferrofluid can provide a ferrofluid that is more electrically conductive or more electrically resistive in accordance with the goals of a particular application.

Examples of ferromagnetic particles that can be used in ferrofluids include cobalt, iron, and iron-cobalt compounds (such as magnetite). A ferrofluid can use ferromagnetic particles of a single kind, a single composition, or a variety of kinds or compositions. Dimensions of the ferromagnetic particles in a ferrofluid can be small, e.g., in the order of nanometers (nm). In one example, a ferrofluid can have an average ferromagnetic particle size of 10 nm.

Examples of surfactants that can be used in ferrofluids include cis-oleic acid, tetramethylammonium hydroxide, citric acid, and soy-lecithin. In some applications, the type of surfactant used can be a determining factor in the useful life of a ferrofluid. In various applications, a ferrofluid can be a stable substance that can be reliably used for several years before the surfactants lose effectiveness.

Examples of carrier fluids include water-based fluids and oil-based fluids. In one example, a ratio by weight in a ferrofluid can be 5% ferromagnetic particles, 10% surfactants, and 85% carrier liquid.

In some aspects, a downhole system, a tool, or a method is provided for enhancing magnetic fields using ferrofluids according to one or more of the following examples.

Example #1

A downhole system can include a tool body, a source of ferrofluid, and a positioning magnet. The source of ferrofluid can be coupled with or in the tool body. The positioning magnet can be magnetically coupled with ferrofluid from the source and positioned for enhancing or directing a magnetic field through at least a portion of an annulus between the tool body and a wellbore formation.

Example #2

The downhole system of Example #1 may feature an antenna positioned for at least one of transmitting or receiving RF magnetic signals through the ferrofluid arranged in the annulus.

Example #3

The downhole system of any of Examples #1-2 may feature a static magnet positioned in the tool body. The positioning magnet can be positioned to arrange the ferrofluid. The ferrofluid can be arranged adjacent to the static magnet such that a strength of a magnetic field from the static magnet is increased at a distance from the magnet.

Example #4

The downhole system of any of Examples #1-3 may feature a positioning magnet that can be magnetically coupled with the ferrofluid for arranging the ferrofluid from the source to span between the tool body and the wellbore formation.

Example #5

The downhole system of any of Examples #1-4 may feature a nuclear magnetic resonance logging tool. The positioning magnet can be magnetically coupled with the ferrofluid for arranging the ferrofluid from the source to enhance or direct at least one magnetic field of the nuclear magnetic resonance logging tool.

Example #6

The downhole system of any of Examples #1-5 may feature at least two ferrofluid isolators positioned along a face of the tool body such that the ferrofluid is retained in a shape protruding from the face between the at least two ferrofluid isolators.

Example #7

The downhole system of any of Examples #1-6 may feature a first baffle, a second baffle, and a passageway. The first baffle can be positioned at a first end of the tool body. The second baffle can be positioned at a second end of the tool body. The first baffle and the second baffle can be positioned to divert flow of wellbore fluid away from a sheltered region in the annulus. The sheltered region can be positioned adjacent to the tool body and defined between the first baffle and the second baffle. The passageway can be positioned internal to the tool body. The passageway can provide a flow path for wellbore fluid diverted by the first baffle and the second baffle to flow between the first end and the second end of the tool body. The ferrofluid can be positioned by the positioning magnetic within the sheltered region of the annulus.

Example #8

The downhole system of any of Examples #1-7 may feature a ferrofluid collector positioned to collect ferrofluid in the annulus and communicate the ferrofluid to the source of the ferrofluid.

Example #9

The downhole system of any of Examples #1-8 may feature a source that can be positioned for arranging the ferrofluid within the annulus by controlling a flow of the ferrofluid into a position in the annulus for magnetic coupling with the positioning magnet Example #10

The downhole system of any of Examples #1-9 may feature a system control center programmed with machine readable instructions to control the source of ferrofluid or the positioning magnet in arranging the ferrofluid within the annulus by at least one of providing commands to the source to introduce ferrofluid or providing commands to the positioning magnet to magnetically couple with the ferrofluid.

Example #11

A downhole system can include a tool body, a positioning magnet, and a source of ferrofluid. The positioning magnet can be coupled with or in the tool body. The source of ferrofluid can be positioned for arranging the ferrofluid within an annulus between the tool body and a wellbore formation by controlling a flow of ferrofluid into a position in the annulus for magnetic coupling with the positioning magnet for enhancing a magnetic field through at least a portion of the annulus.

Example #12

The downhole system of any of Examples #1-11 may feature a positioning magnet that can include at least two magnets magnetically coupled with the ferrofluid for arranging the ferrofluid in a radially omnidirectional shape about an exterior portion of the tool body.

Example #13

The downhole system of any of Examples #1-12 feature a source that comprises a ferrofluid tank and a nozzle. The nozzle can be positioned for communicating a flow of ferrofluid from the ferrofluid tank to the annulus. The downhole system may also feature a ferrofluid collector. The ferrofluid collector can be positioned to collect ferrofluid in the annulus from the source. The ferrofluid collector can be positioned to convey the collected ferrofluid to the ferrofluid tank. The downhole system may also feature a ferrofluid filter. The ferrofluid filter can be positioned in fluid communication with the ferrofluid collector such that the ferrofluid filter reduces wellbore fluids conveyed to the ferrofluid tank by the ferrofluid collector.

Example #14

The downhole system of any of Examples #1-13 may feature an upper ferrofluid isolator and a lower ferrofluid isolator. The upper ferrofluid isolator can be positioned along a face of the tool body. The upper ferrofluid isolator can be positioned above the source of ferrofluid. The lower ferrofluid isolator can be positioned along the face of the tool body. The lower ferrofluid isolator can be positioned below the source of ferrofluid. The upper ferrofluid isolator and the lower ferrofluid isolator may be positioned such that the ferrofluid is retained in a vertical region along the face of the tool body between the upper ferrofluid isolator and the lower ferrofluid isolator.

Example #15

The downhole system of any of Examples #1-14 may feature a first ferrofluid isolator and a second ferrofluid isolator. The first ferrofluid isolator can be positioned laterally in a first direction from the ferrofluid source along a face of the tool body. The second ferrofluid isolator can be positioned laterally in a second direction from the ferrofluid source along the face of the tool body. The first ferrofluid isolator and the second ferrofluid isolator may be positioned such that the ferrofluid is retained in a lateral region along the face of the tool body between the first ferrofluid isolator and the second ferrofluid isolator.

Example #16

The downhole system of any of Examples #1-15 may feature a system control center programmed with machine readable instructions for controlling the source of ferrofluid or the positioning magnet in arranging the ferrofluid. The system control center may arrange the ferrofluid within the annulus by at least one of providing commands to the source to control the flow of ferrofluid or providing commands to the positioning magnet to magnetically couple with the ferrofluid.

Example #17

A system may include a ferrofluid source, a positioning magnet, and a system control center. The ferrofluid source can be positioned for introducing ferrofluid into an annulus between a tool body and a wellbore formation. The positioning magnet can be magnetically coupled to the ferrofluid in the annulus. The system control center may be programmed with machine readable instructions to control the ferrofluid source or the positioning magnet in arranging the ferrofluid for enhancing or directing a magnetic field through at least a portion of the annulus. The system control center may control the ferrofluid source or the positioning magnet by at least one of providing commands to the source to introduce ferrofluid or providing commands to the positioning magnet to magnetically couple with the ferrofluid.

Example #18

The system of any of Examples #10, 16, or 17 may feature a magnetometer. The magnetometer can be positioned to detect a level of ferrofluid from the source in the annulus. The system control center can be programmed with instructions to arrange the ferrofluid at least in part based on the level detected by the magnetometer.

Example #19

The system of any of Examples #10, 16, 17, or 18 may feature a ferrofluid collector. The ferrofluid collector can be positioned to collect ferrofluid from the source in the annulus. The system control center can be communicatively coupled to the magnet. The system control center can be programmed with instructions for controlling the magnet in arranging the ferrofluid. The system control center can control the magnet and adjust the magnetic field such that the ferrofluid from the source in the annulus is directed toward the ferrofluid collector.

In some aspects, a tool or a system, such as a system described in any of the forgoing examples, can be utilized to perform a method according to the following additional examples.

Example #20

A method can include introducing, by a downhole system having a tool body, a ferrofluid source, and a positioning magnet, ferrofluid from the ferrofluid source into an annulus between the tool body and a wellbore formation. The method can include magnetically coupling the ferrofluid with the positioning magnet. The method can include arranging the ferrofluid to enhance or direct a magnetic field through at least a portion of the annulus by controlling at least one of the ferrofluid source or the positioning magnet.

Example #21

The method of example #20 can include displacing a fluid that is more electrically conductive than the ferrofluid and present in the annulus.

The foregoing description of the aspects, including illustrated examples, of the disclosure has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:
1. A downhole system, comprising:
   a tool body;
   a sensor positioned in or connected with the tool body in a position for detecting changes in a magnetic field that extends through at least a portion of an annulus between the tool body and a wellbore formation;
   a source of ferrofluid coupled with or in the tool body and positioned to introduce ferrofluid through the tool body into the portion of the annulus; and a positioning magnet magnetically coupled with the ferrofluid introduced into the portion of the annulus through the tool body from the source and positioned to enhance or direct the magnetic field through at least the portion of the annulus so that the magnetic field differs in strength or direction in comparison to the magnetic field in the absence of the ferrofluid.

2. The downhole system of claim 1, further comprising an antenna positioned to at least one of transmit or receive RF magnetic signals through the ferrofluid arranged in the annulus.

3. The downhole system of claim 1, further comprising a static magnet positioned in the tool body, the static magnet comprising the positioning magnet or a second magnet provided in addition to the positioning magnet, wherein the ferrofluid is arranged adjacent to the static magnet such that a strength of a magnetic field from the static magnet is increased at a distance from the static magnet in comparison to a strength of the magnetic field from the static magnet at the distance in the absence of the ferrofluid being arranged adjacent to the static magnet.

4. The downhole system of claim 1, wherein the positioning magnet is magnetically coupled with the ferrofluid for arranging the ferrofluid from the source to span between the tool body and the wellbore formation.

5. The downhole system of claim 1, further comprising a nuclear magnetic resonance logging tool, wherein the positioning magnet is magnetically coupled with the ferrofluid to arrange the ferrofluid from the source to enhance or direct at least one magnetic field of the nuclear magnetic resonance logging tool.

6. The downhole system of claim 1, further comprising at least two ferrofluid isolators positioned along a face of the tool body such that the ferrofluid is retained in a shape protruding from the face between the at least two ferrofluid isolators.

7. The downhole system of claim 1, further comprising:
a first baffle positioned at a first end of the tool body;
a second baffle positioned at a second end of the tool body, the first baffle and the second baffle positioned to divert flow of wellbore fluid away from a sheltered region in the annulus, the sheltered region being positioned adjacent to the tool body and defined between the first baffle and the second baffle; and
a passageway positioned internal to the tool body and providing a flow path for wellbore fluid diverted by the first baffle and the second baffle to flow between the first end and the second end of the tool body, wherein the ferrofluid is positioned by the positioning magnet within the sheltered region of the annulus.

8. The downhole system of claim 1, further comprising a ferrofluid collector positioned to collect ferrofluid in the annulus and communicate the ferrofluid to the source of the ferrofluid.

9. The downhole system of claim 1, wherein the source is positioned to arrange the ferrofluid within the annulus by controlling a flow of the ferrofluid into a position in the annulus for magnetic coupling with the positioning magnet.

10. The downhole system of claim 1, further comprising a system control center programmed with machine readable instructions to control the source of ferrofluid or the positioning magnet in arranging the ferrofluid within the annulus by at least one of providing commands to the source to introduce ferrofluid or providing commands to the positioning magnet to magnetically couple with the ferrofluid.

11. A downhole system comprising:
a tool body;
a sensor positioned in or connected with the tool body in a position for detecting changes in a magnetic field that extends through at least a portion of an annulus between the tool body and a wellbore formation;
a positioning magnet coupled with or in the tool body; and
a source of ferrofluid positioned to introduce ferrofluid through the tool body into the portion of the annulus and to arrange the ferrofluid within the portion of the annulus by controlling a flow of ferrofluid into a position in the annulus for magnetic coupling with the positioning magnet to enhance a magnetic field through at least the portion of the annulus so that the magnetic field differs in strength or direction in comparison to the magnetic field in the absence of the ferrofluid.

12. The downhole system of claim 11, wherein the positioning magnet includes a first magnet and a second magnet positioned within the tool body and opposite one another with poles of the same polarity pointing together to produce an elongated magnetic field around the tool body so as to be magnetically coupled with the ferrofluid to arrange the ferrofluid in a radially omnidirectional shape about an exterior portion of the tool body.

13. The downhole system of claim 11, wherein:
the source comprises a ferrofluid tank and a nozzle to communicate a flow of ferrofluid from the ferrofluid tank to the annulus, and
the downhole system further comprises:
a ferrofluid collector positioned to collect ferrofluid in the annulus from the source and to convey the collected ferrofluid to the ferrofluid tank; and
a ferrofluid filter in fluid communication with the ferrofluid collector such that the ferrofluid filter reduces wellbore fluids conveyed to the ferrofluid tank by the ferrofluid collector.

14. The downhole system of claim 11, further comprising:
an upper ferrofluid isolator positioned along a face of the tool body and above the source of ferrofluid;
a lower ferrofluid isolator positioned along the face of the tool body and below the source of ferrofluid such that the ferrofluid is retained in a vertical region along the face of the tool body between the upper ferrofluid isolator and the lower ferrofluid isolator.

15. The downhole system of claim 11, further comprising:
a first ferrofluid isolator positioned laterally in a first direction from the ferrofluid source along a face of the tool body;
a second ferrofluid isolator positioned laterally in a second direction from the ferrofluid source along the face of the tool body such that the ferrofluid is retained in a lateral region along the face of the tool body between the first ferrofluid isolator and the second ferrofluid isolator.

16. The downhole system of claim 11, further comprising a system control center programmed with machine readable instructions to control the source of ferrofluid or the positioning magnet in arranging the ferrofluid within the annulus by at least one of providing commands to the source to control the flow of ferrofluid or providing commands to the positioning magnet to magnetically couple with the ferrofluid.

17. A system comprising:
a tool body;
a sensor positioned in or connected with the tool body in a position for detecting changes in a magnetic field that extends through at least a portion of an annulus between the tool body and a wellbore formation;

a ferrofluid source positioned to introduce ferrofluid through the tool body into the portion of the annulus;

a positioning magnet magnetically coupled to the ferrofluid in the portion of the annulus; and a system control center programmed with machine readable instructions to control the ferrofluid source or the positioning magnet in arranging the ferrofluid to enhance or direct the magnetic field through at least the portion of the annulus by at least one of providing commands to the source to introduce ferrofluid or providing commands to the positioning magnet to magnetically couple with the ferrofluid so that the magnetic field differs in strength or direction in comparison to the magnetic field in the absence of the ferrofluid.

18. The system of claim 17, further comprising:

a magnetometer positioned in or on the tool body to detect a level of ferrofluid from the source in the annulus, wherein the system control center is programmed with instructions to arrange the ferrofluid at least in part based on the level detected by the magnetometer.

19. The system of claim 17, further comprising:

a ferrofluid collector positioned to collect ferrofluid from the source in the annulus, wherein the system control center is programmed with instructions to control the magnet in arranging the ferrofluid such that the ferrofluid from the source in the annulus is directed toward the ferrofluid collector.

20. A method comprising:

introducing, by a downhole system having a tool body, a ferrofluid source, a sensor for detecting changes in a magnetic field, and a positioning magnet, ferrofluid from the ferrofluid source through the tool body into an annulus between the tool body and a wellbore formation;

magnetically coupling the ferrofluid with the positioning magnet; and arranging the ferrofluid to enhance or direct the magnetic field through at least a portion of the annulus by controlling at least one of the ferrofluid source or the positioning magnet so that the magnetic field detected by the sensor differs in strength or direction in comparison to the magnetic field in the absence of the ferrofluid.

21. The method of claim 20, wherein arranging the ferrofluid includes displacing a fluid that is more electrically conductive than the ferrofluid and present in the annulus.

\* \* \* \* \*